United States Patent
Favagrossa

(10) Patent No.: US 11,932,211 B2
(45) Date of Patent: Mar. 19, 2024

(54) ROTATING BRUSH

(71) Applicant: FAVAGROSSA EDOARDO S.R.L., Casalmaggiore (IT)

(72) Inventor: Leonardo Favagrossa, Viadana (IT)

(73) Assignee: FAVAGROSSA EDOARDO S.R.L., Casalmaggiore (IT)

( * ) Notice: Subject to any disclaimer, the term of this patent is extended or adjusted under 35 U.S.C. 154(b) by 176 days.

(21) Appl. No.: 17/592,194

(22) Filed: Feb. 3, 2022

(65) Prior Publication Data
US 2022/0258699 A1 Aug. 18, 2022

(30) Foreign Application Priority Data
Feb. 17, 2021 (IT) .......................... 102021000003629

(51) Int. Cl.
*B60S 3/06* (2006.01)

(52) U.S. Cl.
CPC ...................................... *B60S 3/06* (2013.01)

(58) Field of Classification Search
CPC ............. B60S 3/06; B60S 3/063; B60S 3/066
See application file for complete search history.

(56) References Cited

FOREIGN PATENT DOCUMENTS

DE  10 2016 110 928 A1 * 12/2017
EP         3231674 A1   10/2017

* cited by examiner

*Primary Examiner* — Randall E Chin
(74) *Attorney, Agent, or Firm* — Pearne & Gordon LLP; Bryan M. Gallo

(57) ABSTRACT

A rotating brush for a vehicle washing system, comprising:
i) a shaft (2) rotatable about a rotation axis (20) thereof;
ii) a first annular support means (31) surrounding a first section (21) of said shaft (2) and comprising a first group (310) of longitudinal seats; said first support means (31) extending along the rotation axis (20) between a first and a second base (316, 317); let a first direction (318) of travel of the first group (310) of longitudinal seats be defined by the first towards the second base (316, 317), each of the longitudinal seats of the first group (310) comprising a first and a second end (312, 313);
iii) a first set (41) of cleaning elements engageable in the first group (310) of longitudinal seats.

12 Claims, 13 Drawing Sheets

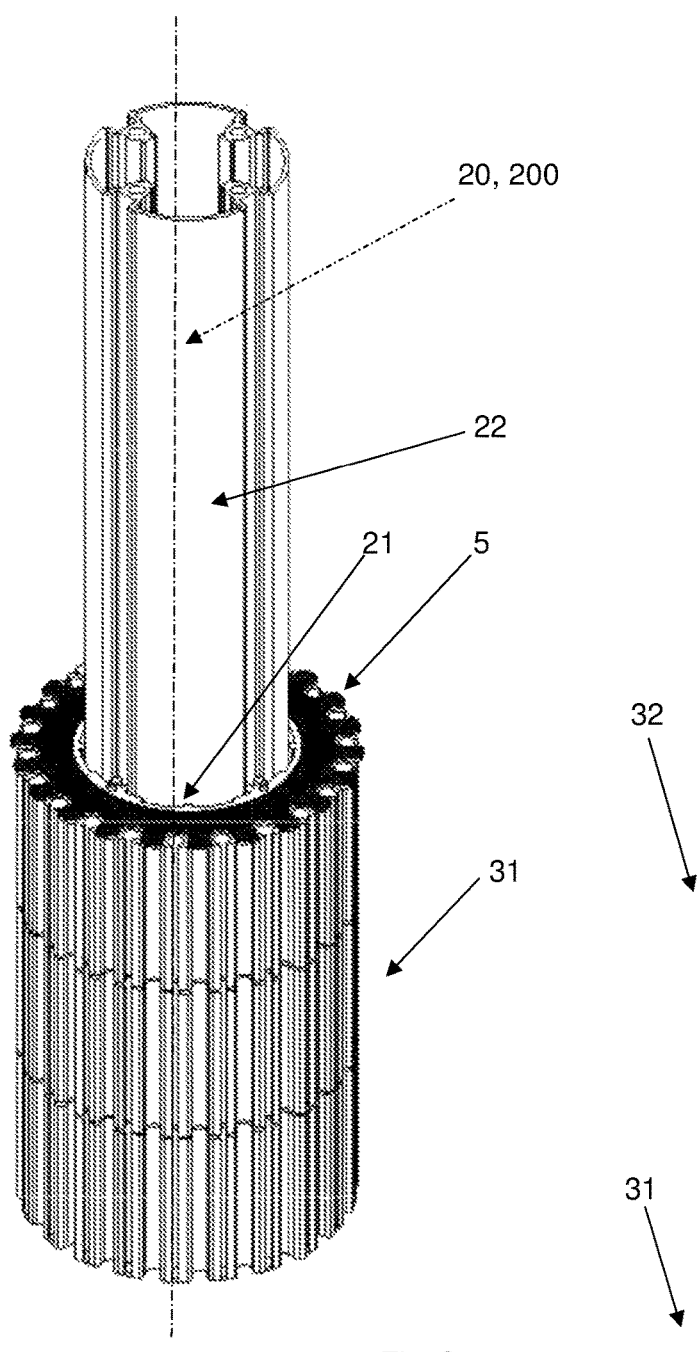
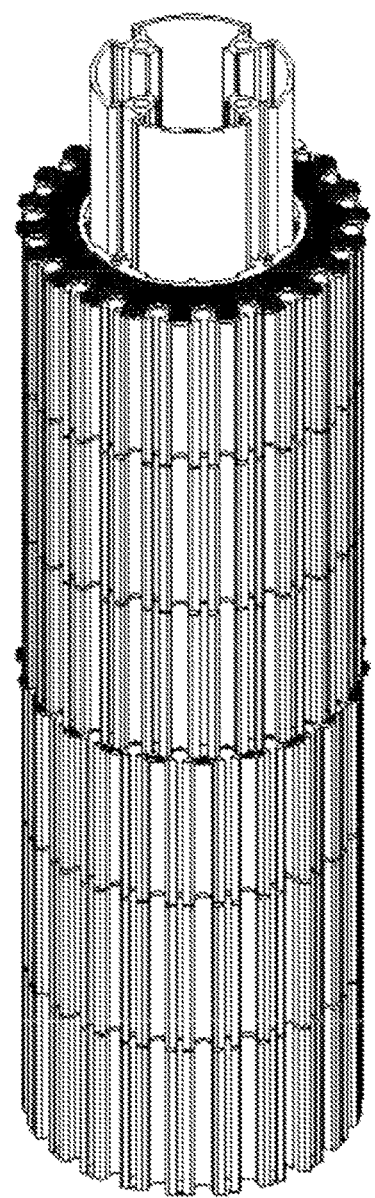
Fig. 3
Fig. 4

ROTATING BRUSH

FIELD OF THE INVENTION

The present invention relates to a rotating brush for a vehicle washing and/or drying system.

BACKGROUND OF THE INVENTION

Brushes comprising a rotating shaft to which a plurality of supports stacked one upon the other may be applied are known. Every support comprises a plurality of grooves in which to position cleaning elements. An insert occludes each groove, defining two adjacent slots per groove. The cleaning elements are applied in a corresponding groove so that two opposite edges thereof project outwards from the groove through the two slots.

One drawback of this solution is tied to the fact that in order to be able to fix a strip, the latter must be folded over and inserted into the groove in order then to be locked in position by applying the insert. This operation must be repeated for every strip. Such a solution has the drawback of making the initial operation of applying the strips slow, above all when it becomes necessary to replace the whole set of them for scheduled maintenance work.

Grooves comprising snap-fit elements positioned halfway inside the groove to enable axial locking of an insert that engages in the groove are likewise known.

One drawback of this solution is tied to the fact that the greater complexity of construction entails higher production costs.

BRIEF SUMMARY OF THE INVENTION

In this context, the technical task at the basis of the present invention is to propose a rotating brush for a vehicle washing system that enables the operation of replacing the strips to be made quicker.

The stated technical task and the specified objects are substantially achieved by a rotating brush for a vehicle washing system comprising the technical features disclosed in one or more of the appended claims.

BRIEF DESCRIPTION OF THE DRAWINGS

Additional features and advantages of the present invention will emerge more clearly from the approximate and thus non-limiting description of a preferred but not exclusive embodiment of a rotating brush for a vehicle washing system as illustrated in the appended figures, in which:

FIGS. 3 to 6 show a sequence of steps for assembling a brush according to the present invention;

DETAILED DESCRIPTION OF PREFERRED EMBODIMENTS

Figure 1:
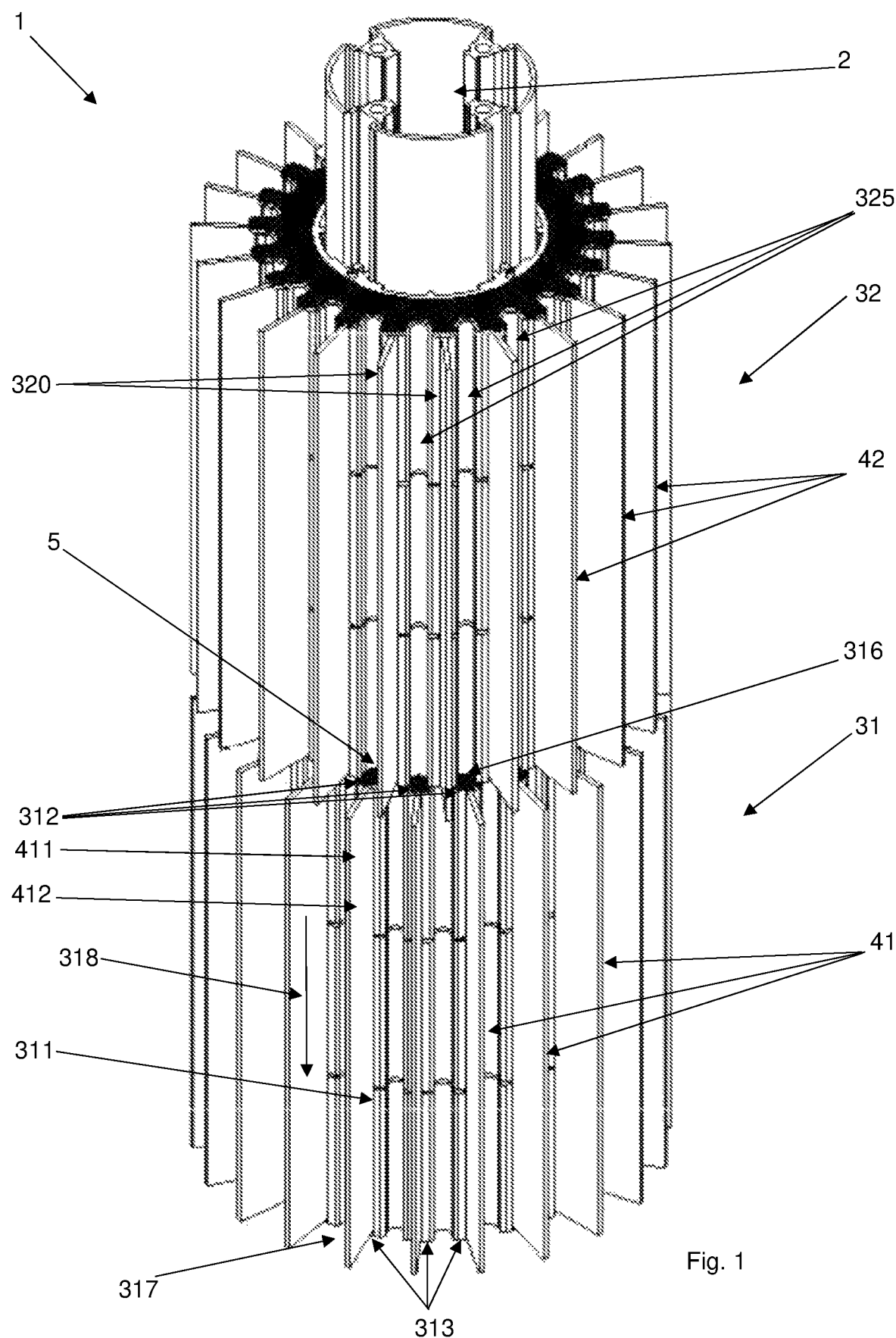
FIG. 1 shows a view of a brush according to the present invention.
Figure 2:
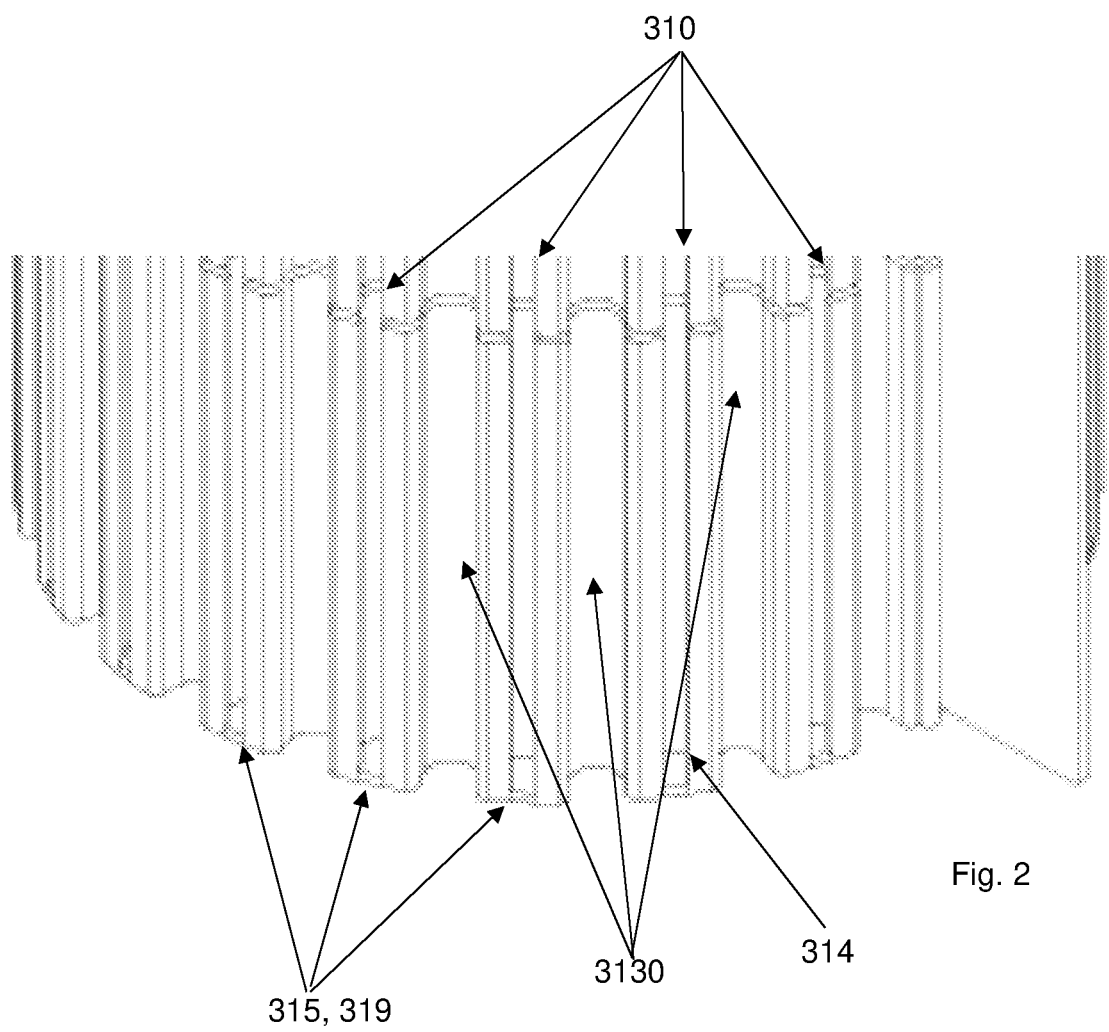
FIG. 2 shows a detail of the brush in FIG. 1, from which some parts have been omitted to better illustrate others.
Figure 5:
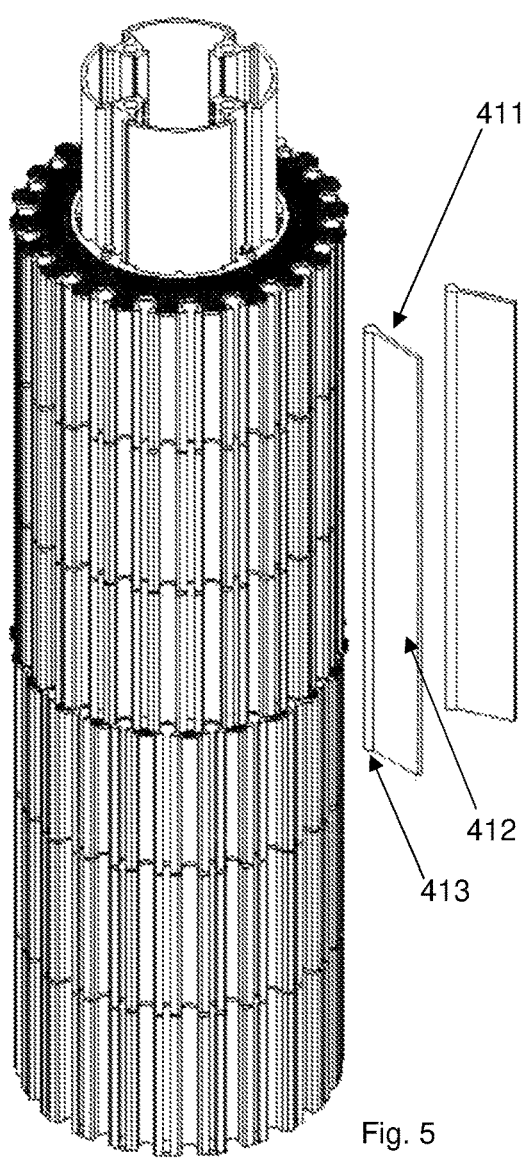
Figure 6:
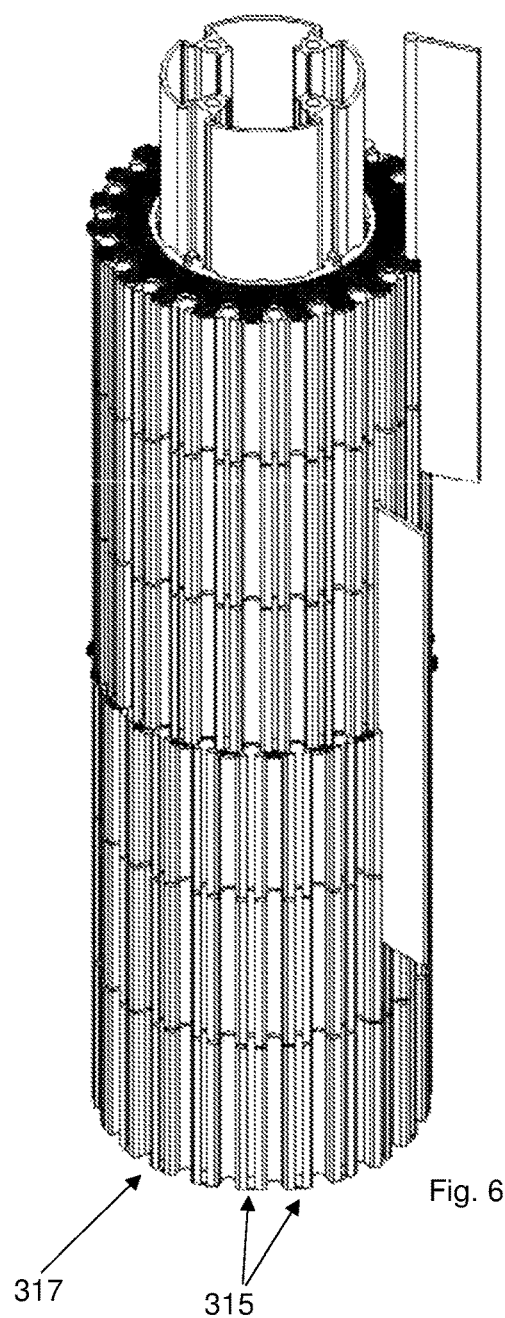

In the appended figures, the reference number 1 indicates a rotating brush for a vehicle washing system, the vehicle being typically an automobile.

The brush 1 can be used to wash and/or clean a vehicle.

The brush 1 comprises a shaft 2 rotatable about a rotation axis 20 thereof.

The rotation axis 20 extends along a first direction 200. The direction 200 is typically vertical or horizontal. The shaft 2 is motorised. Therefore, it is set into rotation by a motor. Advantageously, but not necessarily, the shaft 2 is tubular. For example, the shaft 2 is made of metal or plastic material.

The brush 1 comprises a first support means 31 (in the course of the present description, the support means can also be defined as a "bushing"). The first support means 31 is annular. The first support means 31 surrounds a first section 21 of said shaft 2. The first section 21 is a longitudinal section of the shaft 2. Conveniently, the first support means 31 can be a single annular body (typically monolithic) or an assembly of several pieces (for example several annular elements on top of one another or two or more half-shells which, assembled together, define one or more annular elements). For example, in the solution in FIGS. 1-6, 9 and 10 the first support means 31 comprises a plurality of separate annular structures arranged consecutively along the rotation axis 20. In the solution in FIGS. 14-21, the first support means 31 is instead a single annular body. Conveniently, the first support means 31 is made of plastic material. The first support means 31 is removably connected to the shaft 2. The first support means 31 extends along the rotation axis 20 between a first and a second base 316, 317. Said bases can for example be annular ends. As exemplified in FIG. 1, in the present description a first direction 318 of travel of the first group 310 of longitudinal seats is defined from the first base towards the second base 316, 317.

The first support means 31 comprises a first group 310 of longitudinal seats. Each of the longitudinal seats of the first group 310 comprises a first and a second end 312, 313. The first end 312 is advantageously positioned at the first base 316. The second end 313 is advantageously positioned at the second base 317. In the solution in FIGS. 1-6, 9 and 10 the first group 310 of longitudinal seats extends so as to involve the plurality of annular structures (three in the specific case) that define the first support means 31. The brush 1 comprises a first set 41 of cleaning elements (for example the cleaning elements can also be defined as strips; they might or might not be fringed). The cleaning elements are intended to rub over the surface of the automobile with the objective of washing and/or drying the latter. The cleaning elements of the first set 41 are engageable in the first group 310 of seats fashioned in the first support means 31. The first group 310 of seats are rectilinear and conveniently vertical (as shown for example in FIG. 10), but they could also be inclined relative to the vertical (as shown for example in FIG. 9).

The first group 310 of seats is fashioned at least in part (preferably exclusively) on the lateral surface of the first support means 31. The lateral surface is substantially cylindrical.

Conveniently, each cleaning element of the first set 41 is engageable in a corresponding seat of the first group 310.

A first cleaning element 411 of said first set 41 comprises:
a flexible part 412 intended to come in contact with the vehicle; for example it can be made of felt or microfibre or a composite material or an expanded plastic material such as polyethylene or EVA;
an insert 413 intended to be inserted (at least partly) into a first seat 311 of said first group 310 of seats (fashioned on the first support means 31).

The insert 413 thus acts as an anchorage. The insert 413, in the operating position, is not extractible from the first seat 311 exclusively with a movement orthogonal to the rotation axis 20. Conveniently, the part of the insert 413 positioned inside the first seat 311 extends longitudinally. The first seat 311 also extends longitudinally, in particular rectilinearly.

The flexible part 412 is constrained to the insert 413. Conveniently, the flexible part 412 is external to the first seat 311. The insert 413 is conveniently a less flexible element than the flexible part 412. It is thus more rigid. It can be easily positioned in the seats of the first group 310. The insert 413 is at one end of the flexible part 412. In particular, the insert 413 is rectilinear. It involves one side of the first cleaning element 411 (it preferably involves the whole side or at least 90% of one side of the first cleaning element). The flexible part 412 extends longitudinally away from the insert 413.

The insert 413 comprises a portion that projects outwards from the first seat 311.

What has been described in the course of the present description with reference to the first cleaning element 411 can be repeated for a plurality of (or each of said) cleaning elements of the first set 41. Advantageously, there are at least six cleaning elements in the first set. Conveniently, the cleaning elements of the first set 41 are distributed along the lateral surface of the first support means 31. In particular, they are distributed at equal intervals (they are angularly equally spaced).

Conveniently, the first support means 31 comprises (on a lateral surface) a plurality of grooves 3130. At least a part of the grooves 3130 alternate with the first group 310 of seats. Preferably, one of said grooves 3130 and one of said seats of the first group 310 alternate with each other (however, this solution is not necessary; for example, between two adjacent grooves 3130 there could be one or more seats of the first group 310 or vice versa).

Conveniently, the grooves 3130 allow for the extraction/insertion of the cleaning elements positioned in the underlying support means (as better explained below). The grooves 3130 are advantageously rectilinear.

The shaft 2 passes through the first support means 31. It thus sets the first support means 31 and the first set 41 of cleaning elements into rotation about the rotation axis 20.

The insert 413 is extractible from said first seat 311. Conveniently, this takes place by longitudinal sliding along the first seat 311. Conveniently, this takes place translatably.

The insert 413 is preferably extractible from the first seat 311 of the first group 310 of seats translatably and/or parallelly to the rotation axis 20. The insert 413 is preferably extractible from the first seat 311 of the first group 310 of seats with a movement that has a component of displacement along the rotation axis 20. The insert 413 is preferably slidably extractible from the first seat 311 of the first group 310 of seats (or rather, with a sliding movement only).

The first seat 311 comprises a single slot 314 adapted to allow the first cleaning element 411 to project outwards from the first seat 311.

In particular the first seat 311 defines a single longitudinal slot 314 which allows the first cleaning element 411 to project outwards from the first seat 311.

The insert 413 and the first seat 311, transversely to the first direction 200, can be reciprocally complementarily shaped.

Conveniently, this facilitates the use of original spare parts.

For example, either the first seat 311 or the insert 413 could comprise a protrusion and the other one a recess that has a substantially complementary shape. For example, the protrusion and the recess define a discontinuity along a cross section defined by a regular curve of the insert 413 and of the recess.

For example, the protrusion or the recess are fashioned in said first seat 311 on an opposite side relative to the slot 314. In a particular solution, however, the slot 314 precludes the passage of the whole insert 413 through the slot itself (i.e. the slot 314 does not allow the whole insert 413 to pass through it). In fact, the slot 314 has a narrower width than the insert 413.

In a plane orthogonal to said first direction 200, the first seat 311 and the insert 413 are substantially triangular, or else they could be substantially round with possible discontinuities (to facilitate centring).

Conveniently, the brush 1 comprises a limit stop means 315 for the first set 41 of cleaning elements. The limit stop means 315 stops a movement of the first set 41 of cleaning elements, said movement taking place according to the first direction 318 along the first group 310 of seats. The limit stop means 315 is advantageously positioned at the second base 317.

The limit stop means 315 is integrated into the first support means 31. In particular, the limit stop means 315 is in a single piece with the first support means 31. It thus defines a single monolithic block with the remaining parts of the first support means 31.

Conveniently, the seats of the first group 310 have, at the second end 313 thereof, a bottom 319 that precludes the passage of the first set 41 of cleaning elements through the second end 313.

In particular the bottom 319 defines/is a lower wall that prevents the first set 41 of elements from falling through the second end 313.

The bottom 319 is therefore a rest surface for at least the first cleaning element 411.

Each seat of the first group 310 comprises two lateral sides that are reciprocally connected by the bottom 319. The bottom 319 defines a surface orthogonal to the two lateral sides. Said bottom 319 closes off the seats of the first group 310. The bottom 319 extends continuously. The bottom is therefore closed off.

Figure 22:
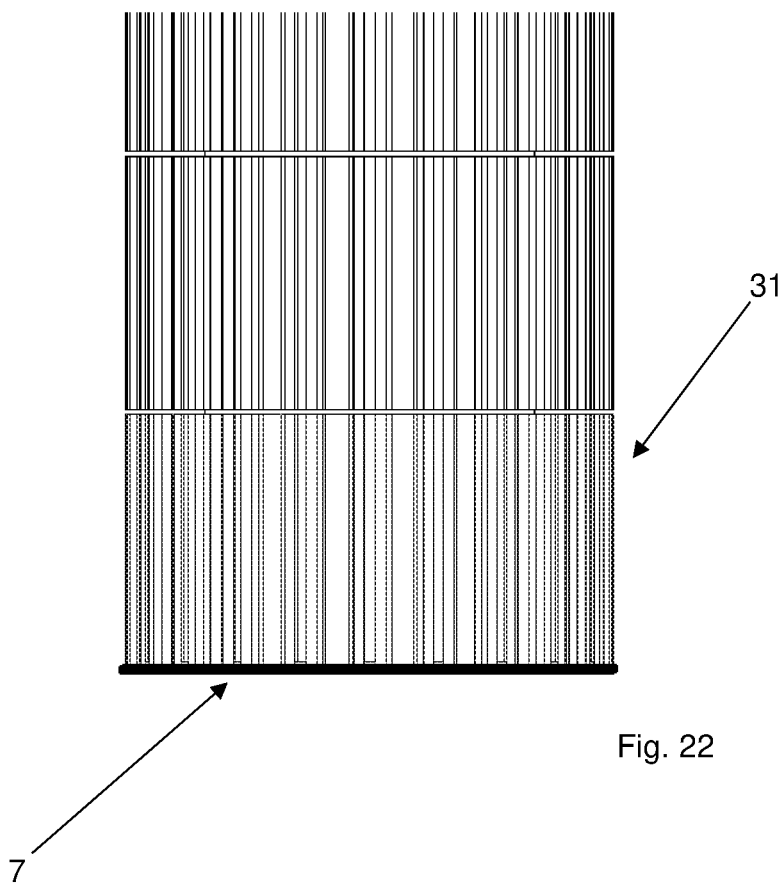
FIG. 22 shows a detail of a variant of the brush according to the present invention.

In an alternative solution schematically illustrated in FIG. 22, the brush 1 comprises a disk 7 positioned consecutively to the second base 317 along the rotation axis 20. The disk 7 comprises the limit stop means 315. In this case the disk 7 is separate from the first support means 31.

Figure 7:
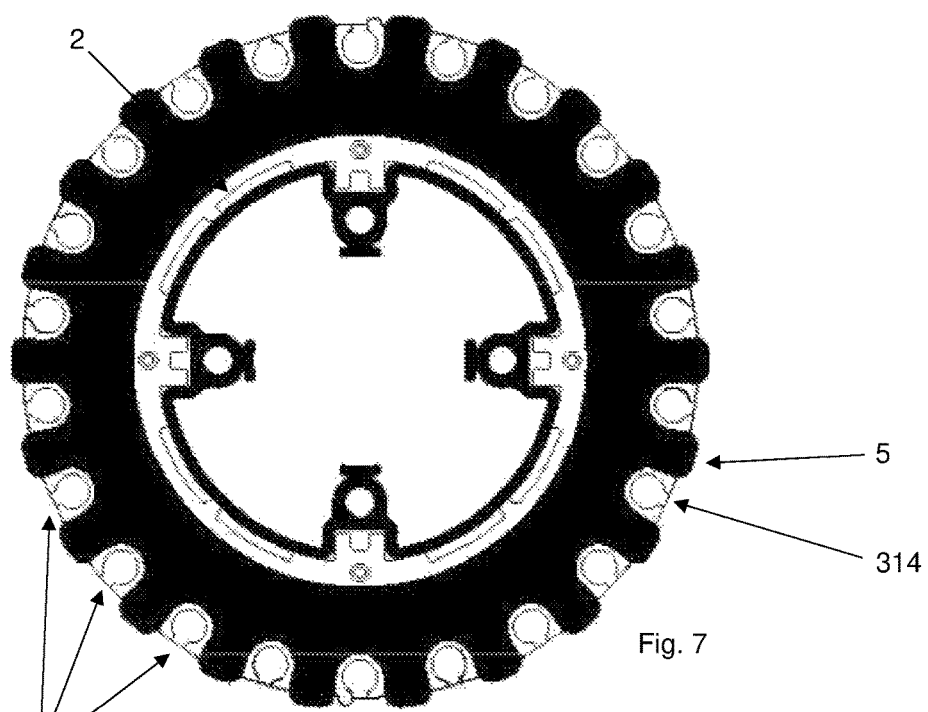
FIGS. 7 and 8 show two distinct configurations of one particular element of a brush according to the present invention.
Figure 8:
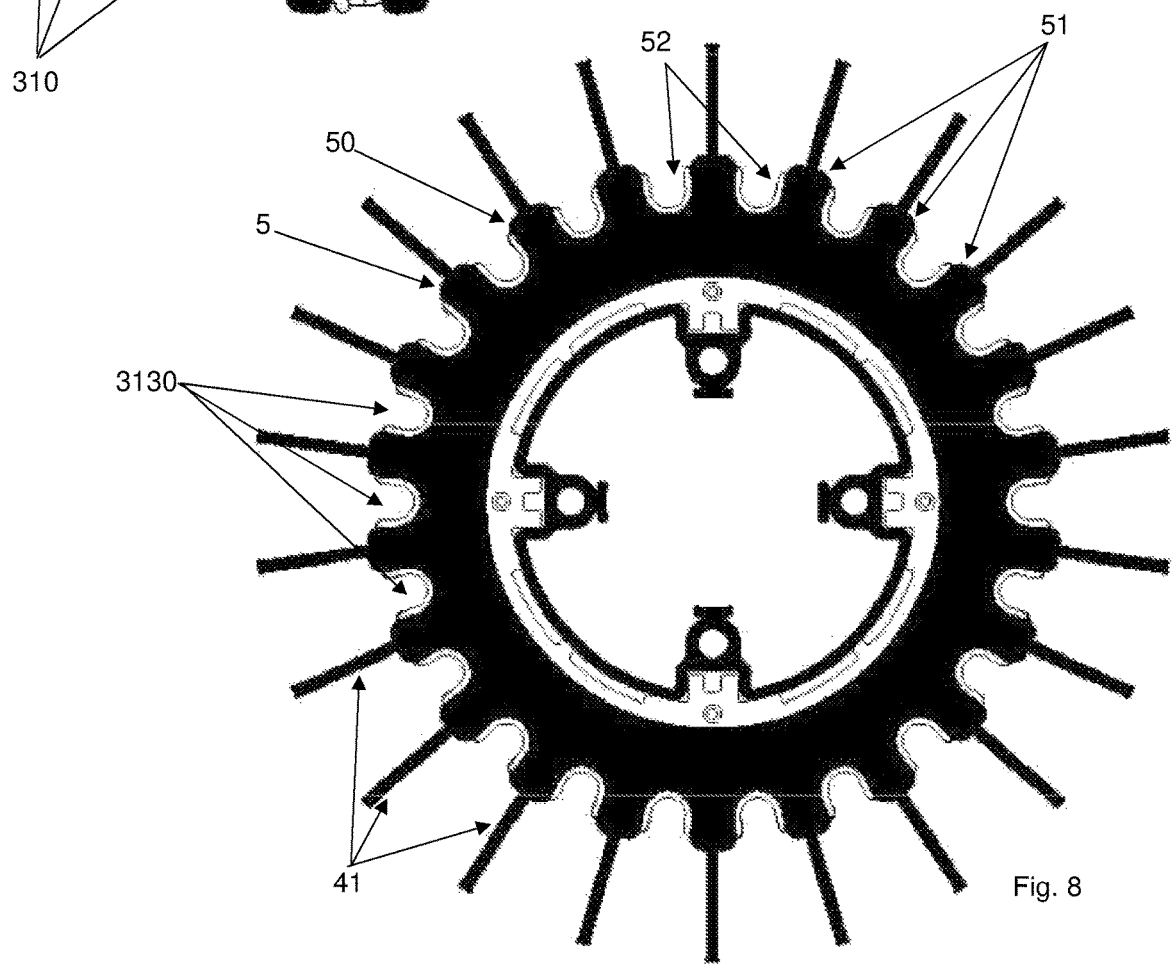
Figure 9:
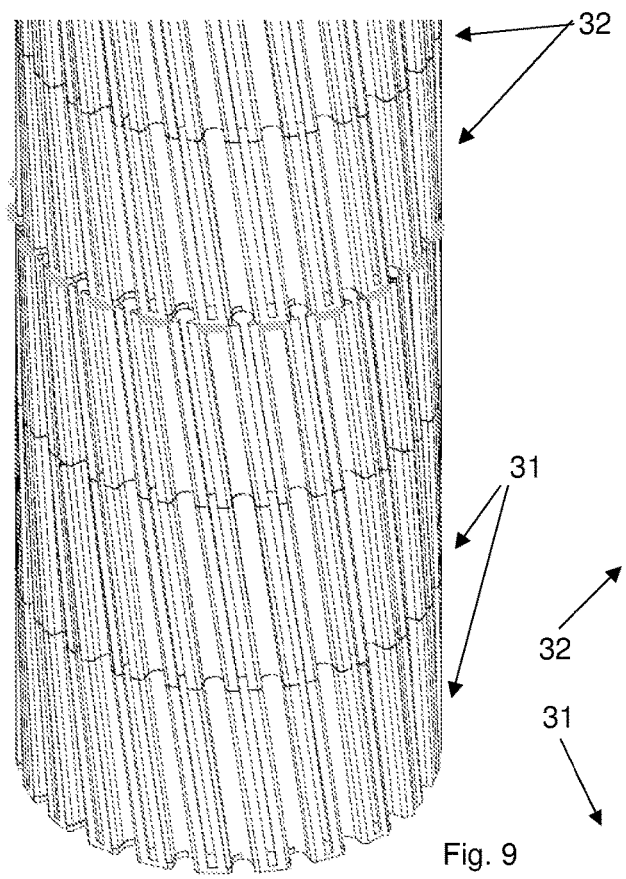
FIGS. 9 and 10 show two alternative solutions of a portion of a brush according to the present invention.
Figure 10:
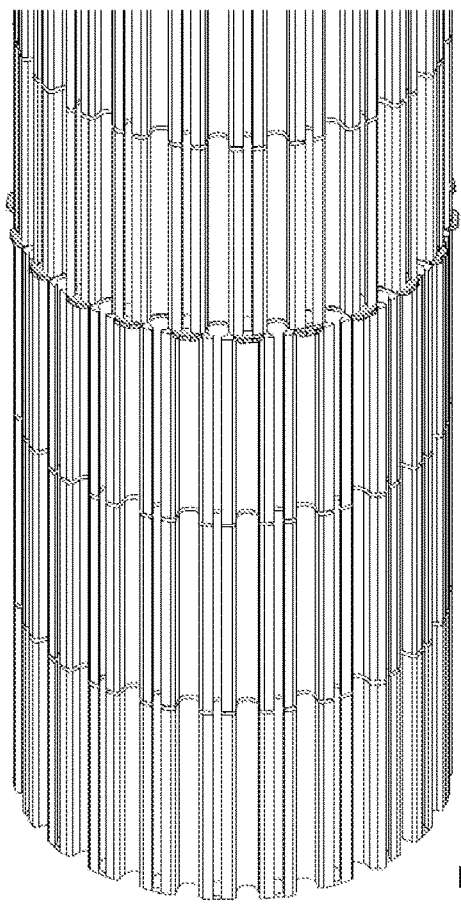
Figure 11:
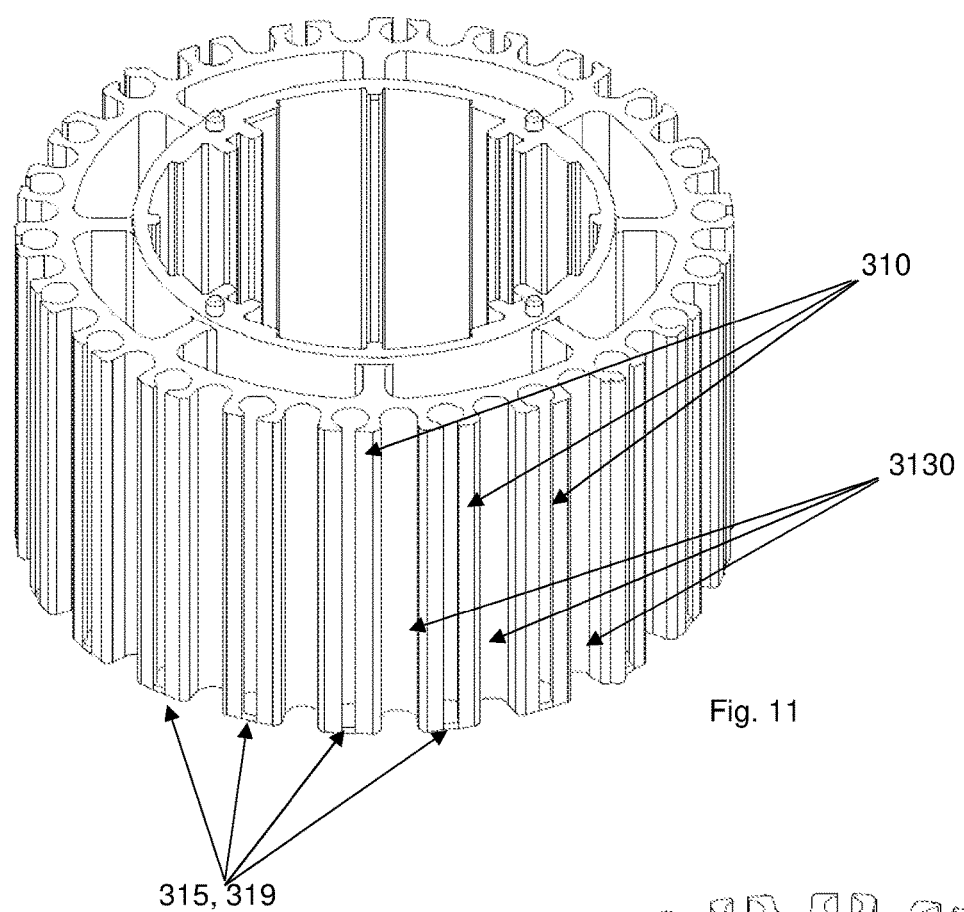
FIGS. 11 and 12 show two distinct components of FIG. 10.
Figure 12:
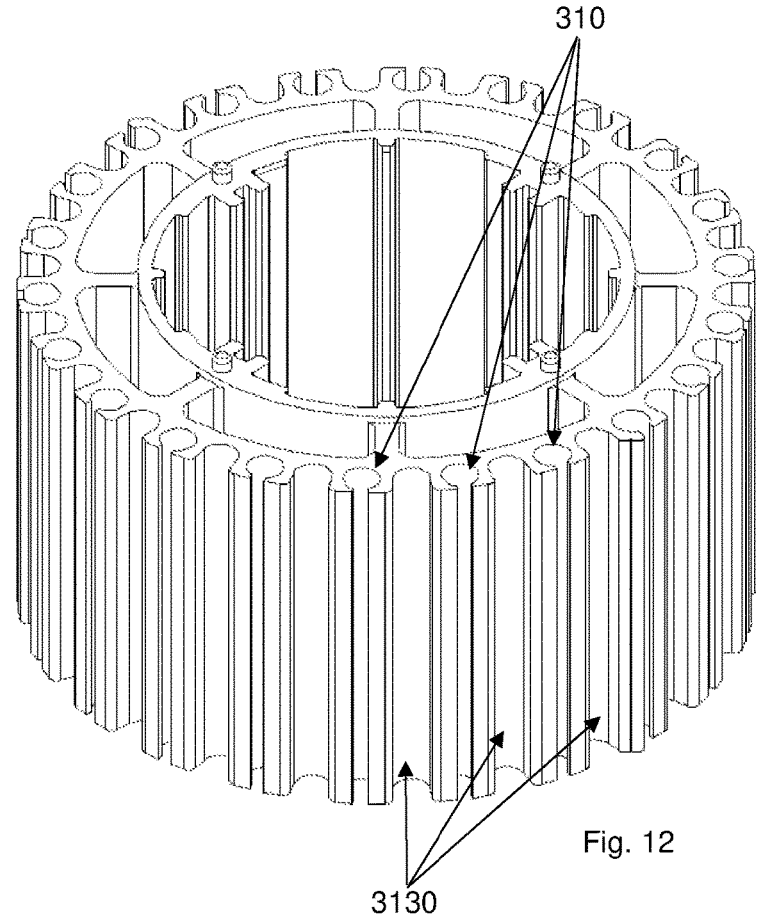
Figure 13:
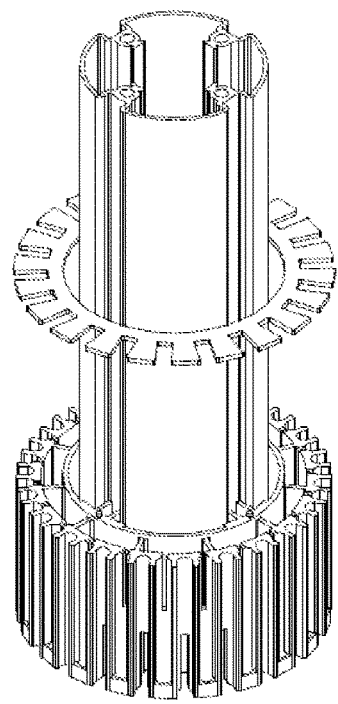
FIGS. 13 to 21 show a sequence of steps for assembling a brush according to the present invention.
Figure 14:
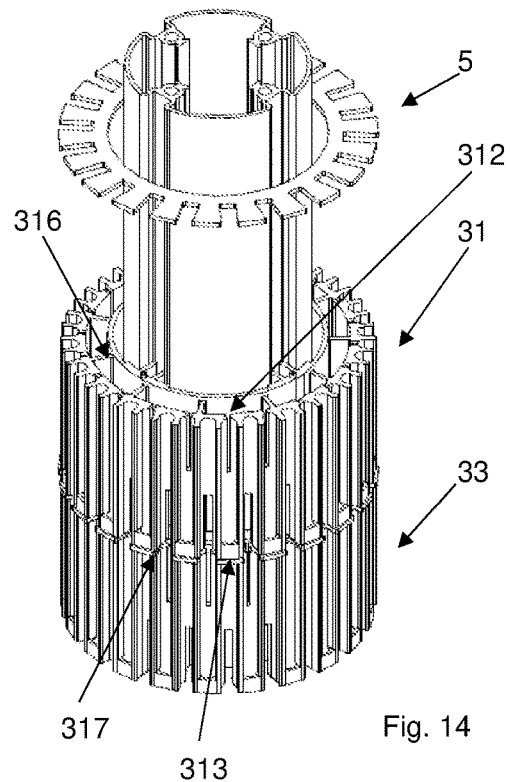
Figure 15:
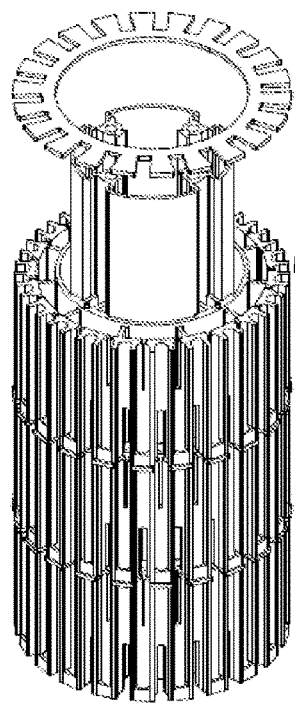
Figure 16:
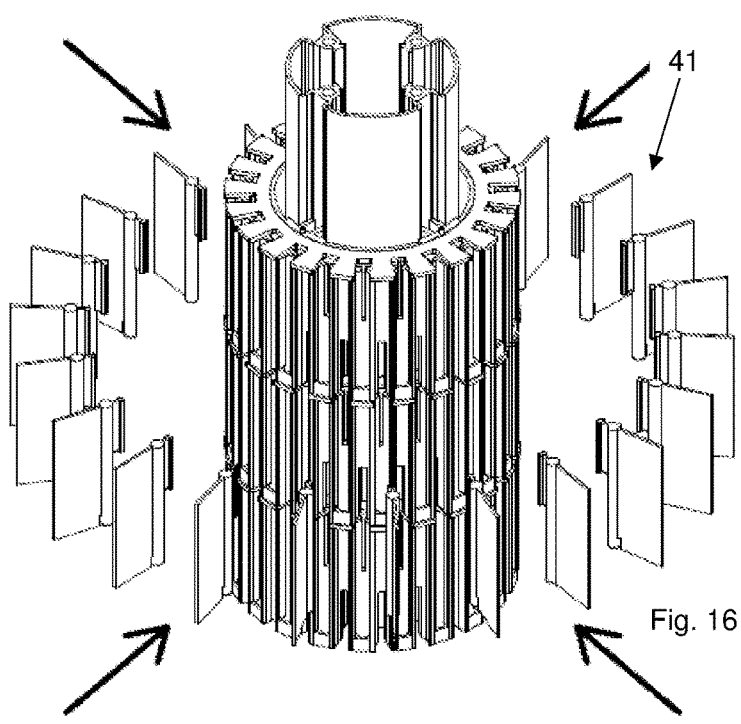
Figure 17:
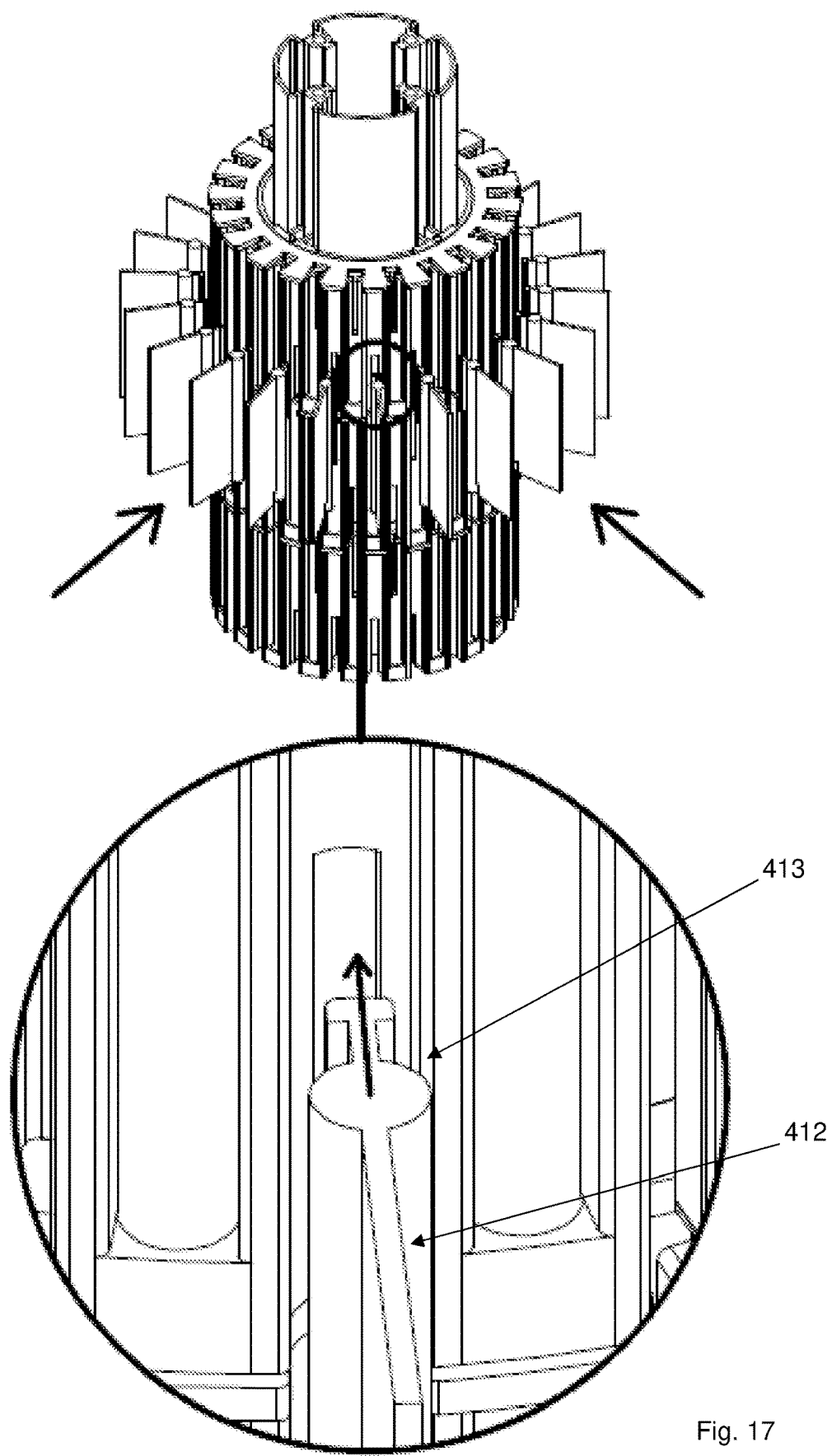
Figure 18:
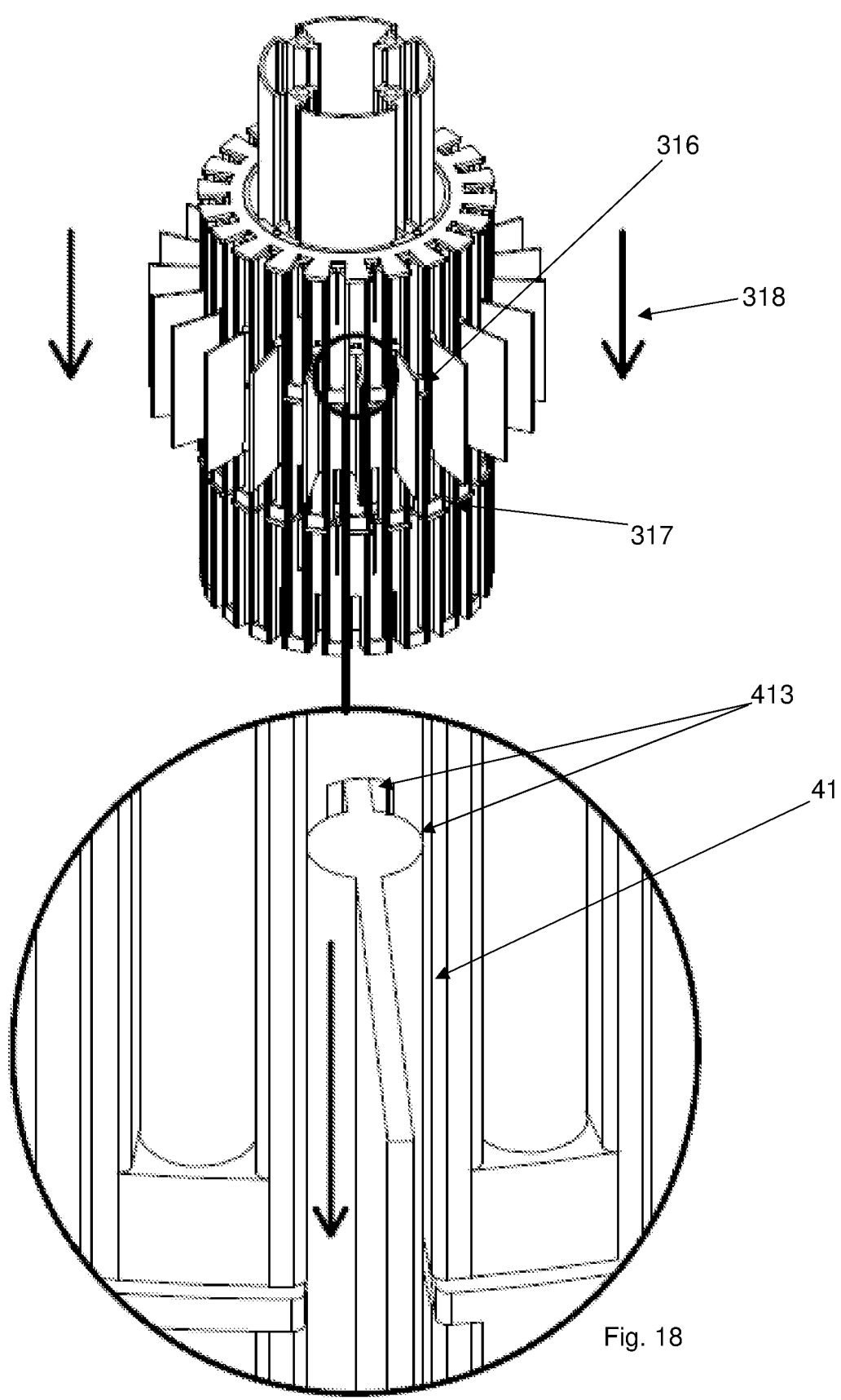

Advantageously, the brush 1 comprises a rotatable element 5 movable between a first configuration in which the first end 312 of the seats of the first group 310 is obstructed (see FIG. 8) and a second configuration in which it frees said first end 312 (see FIG. 7), enabling the extraction of the first set 41 of cleaning elements. In the first configuration, the rotatable element 5 is rotated relative to the second configuration. The rotatable element 5 can be manually moved. The rotatable element 5 can be moved both from the first to the second configuration and from the second to the first configuration.

Advantageously the rotatable element 5 is positioned consecutively to the first support means 31 along the first direction 200.

The rotatable element 5 is preferably an annular element. Advantageously, but not necessarily, it is coaxial with first support means 31. The rotatable element 5 is preferably rotatable about the axis 20.

Advantageously, the rotatable element 5 is positioned above said first support 31.

Figure 19:
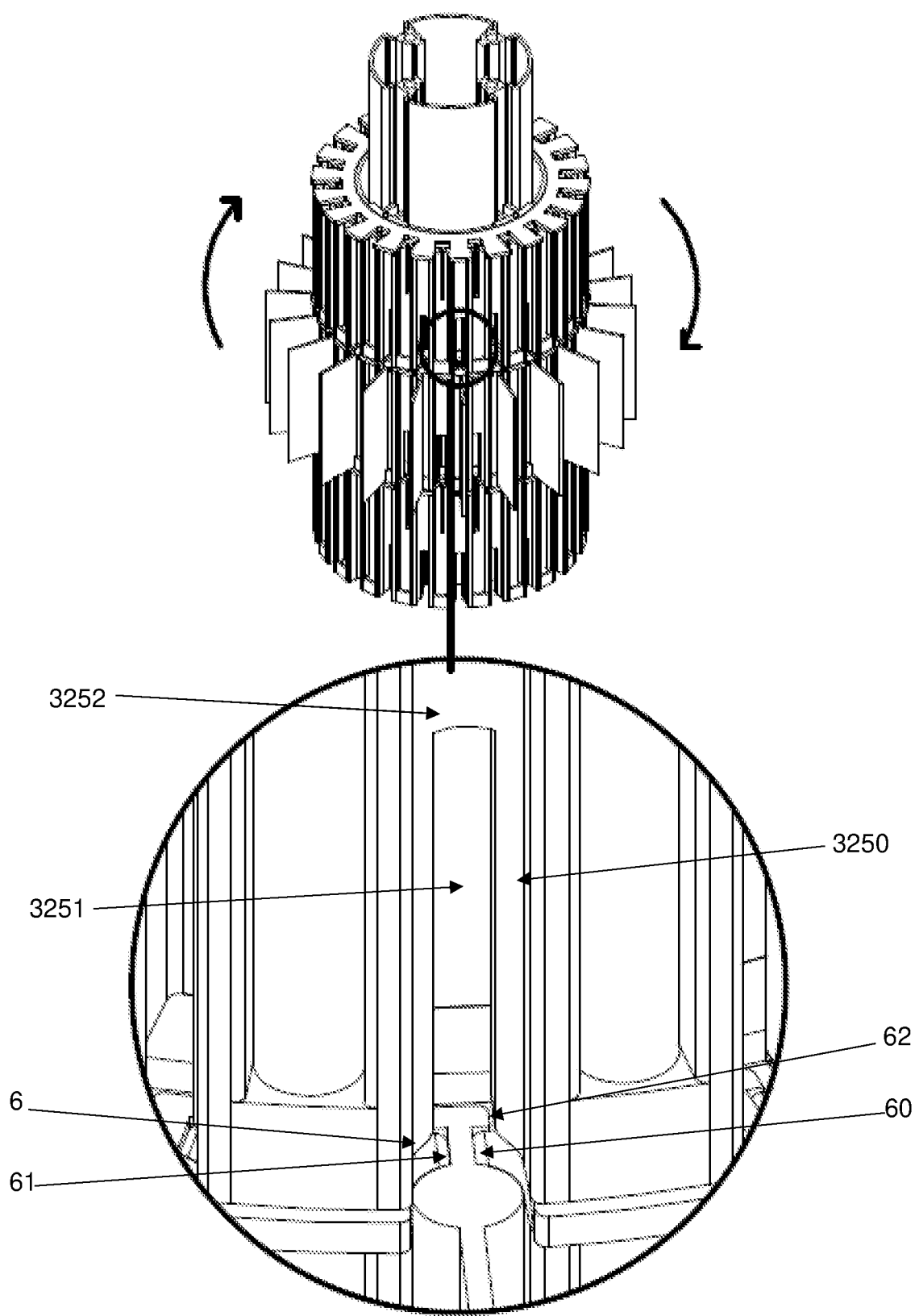

In a particular solution illustrated in FIG. 19, the first support means 31 comprises a channel 6 to the rear of the first seat 311; conveniently, the channel 6 extends only along a portion of the longitudinal extent of the first seat 311. The channel 6 and the first seat 311 of the first group 310 are separated by a wall 60 having a connecting slot 61. The slot 61 thus places the channel 6 and the first seat 311 in communication. The insert 413 of the first cleaning element 411 comprises an anchorage means 62 that passes through said slot 61 and widens in said rear channel 6 in order to prevent the radial extraction of the first cleaning element 411 from the first support means 31. Conveniently, all of the seats of the first group 310 have said channel 6.

The brush 1 advantageously comprises a second annular support means 32 that surrounds a second section 22 of the shaft 2. The second support means 32 comprises a second group 320 of seats in which a second set 42 of cleaning elements are engaged.

Conveniently, every cleaning element of the second set 42 engages in a corresponding seat of the second group 320. Conveniently, the seats of the second group 320 comprise a stop bottom for the cleaning elements of the second set.

The second support means 32 comprises extraction channels 325 for extracting the first set 41 of cleaning elements from said first group 310 of seats. The extraction channels 325 are aligned with the first group 310 of seats; the seats of the second group 320 alternate with said extraction channels 325.

The first and the second support means 31, 32 are modular elements. Advantageously, they are identical to each other. In particular, they have the same geometry and/or are made of the same material. What has been indicated in the course of the present description for the first support means 31 can be repeated for the second support means 32. What has been indicated for the interaction between the first support means 31 and the first set 41 of cleaning elements can be repeated for the interaction between the second support means 32 and the second set 42 of cleaning elements. Conveniently, the first and the second support means 31, 32 are positioned one after the other along the rotation axis 20. Conveniently, they are stacked one on top of the other. Conveniently, the second support means 32 is positioned above the first support means 31 (for example in the case where the rotation axis 20 extends from top to bottom).

The extension of the first group 310 of seats conveniently takes place towards the second support means 32. Advantageously, for a plurality of seats of the first group 310 there is a corresponding extension in the second support means 32, the extension being defined by one of said channels 325. In particular, corresponding to every seat of the first group 310 there is an extension defined by one of said channels 325 in the second support means 32. Conveniently, the seats of the first group 310 are rectilinear and the channels 325 are rectilinear. The channels 325 are aligned, along corresponding lines, with the seats of the first group 310. Conveniently, the channels 325 and seats of the first group 310 are coaxial.

Conveniently, the channels 325 have a concavity facing towards the outside of the brush 1 (they thus define an opening facing towards an imaginary surface that is radially more external). This opening enables the extraction of the insert 413. Conveniently, the opening has a width that is greater than or equal to the width of the insert 314. Said width is also greater than the width of the slot 314. The width is to be measured in a plane orthogonal to the rotation axis 20.

The seats of the second group 320 alternate with said channels 325. In particular, along the lateral surface of the second support means 32 the seats of the second group 320 and said channels 325 alternate with each other. Conveniently, the seats of the second group 320 and said channels 325 alternate with each other along a line that surrounds said rotation axis 20 and is located along the lateral surface of the second support means 32. Conveniently, a seat of the second group 320 and a seat of the extraction channel 325 alternate with each other (but, for example, a plurality of adjacent seats of the second group 320 could alternate with one or more seats of the channel 325 or vice versa).

Figure 20:
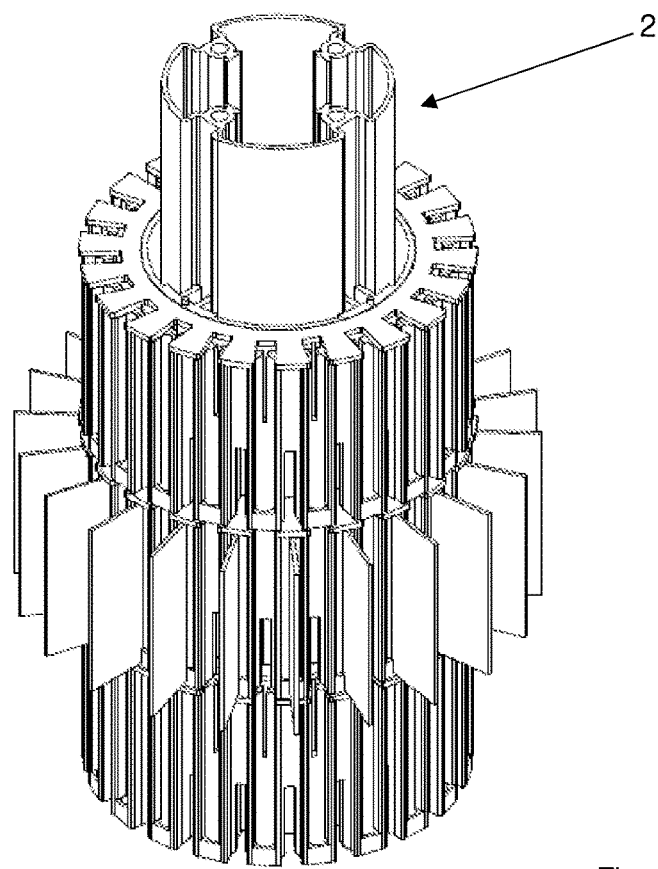
Figure 21:
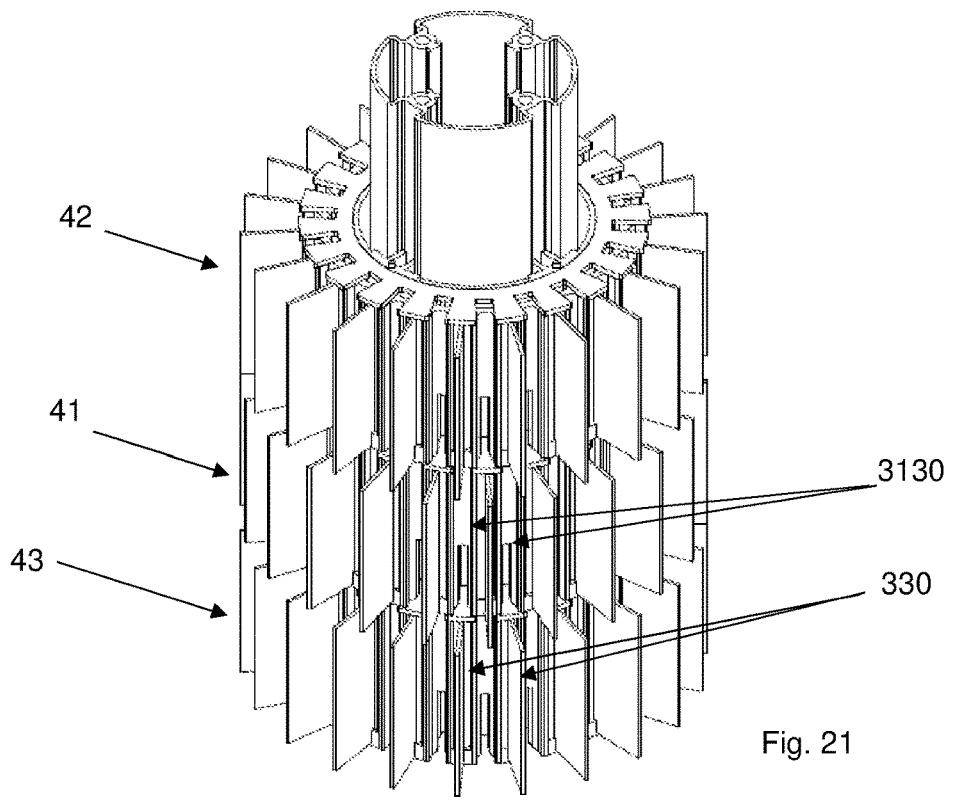

As exemplified in FIG. 20 in a plan view (or in any case in a plane orthogonal to the rotation axis 20), the first and the second set 41, 42 of cleaning elements are reciprocally offset (in a configuration wherein they are mounted respectively on the first and second support means 31, 32). Conveniently, the first group 310 of seats is aligned with the channels 325. Conveniently, the first set 41 of cleaning elements is aligned with said channels 325.

The channels 325 of the second support means 32 functionally correspond to the grooves 3130 of the first support means 31.

Conveniently, the second group 320 of seats in turn comprises an end closure which defines a limit stop for the second set 42 of cleaning elements. The circumferential orientation of the second support means 32 is offset relative to the circumferential orientation of the first support means 31. In particular, the second support means 32 is rotated relative to the first support means 31 about the rotation axis 20. In particular, it is rotated by an angle equal to half the angular pitch between two consecutive seats of the first group 310 of seats. In this manner, the cleaning elements of the first support means 31 are offset relative to the cleaning elements of the second support means 32.

Conveniently, the extraction channels 325 comprise a first extraction channel 3250 which is located on an extension of the first seat 311. Conveniently, at least one section of the first extraction channel 3250 is intended for the passage of at least one section of the insert 413, in particular it allows the passage of the anchorage means 62. Conveniently, the first extraction channel 3250 comprises a first section 3251 having a greater depth than a second section 3252 consecutive thereto. The first section 3251 of the first extraction channel 3250 is set nearer to the first support means 31 than the second section 3252. The depth is measured in a radial direction. The greater depth of the first section 3251 enables the extraction of the anchorage means 62 positioned in the channel 6. Once the anchorage means 62 is positioned in the first section 3251 of the first extraction channel 3250 it is possible to radially remove the first cleaning element 411. Conveniently, what was described with reference to the first extraction channel 3250 can be repeated for all of the extraction channels 325.

As is exemplified in FIG. 1 (but it is also deducible from FIGS. 14 and 15), the rotatable element 5 is conveniently interposed between the first and the second support means 31, 32. Conveniently, the rotatable element 5 separates the first and the second support means 31, 32. It can be in contact with both the first and the second support means 31, 32.

In the first configuration, the rotatable element 5 obstructs one end of the extraction channels 325 of the second support means 32.

In the first configuration, the rotatable element 5 comprises plug elements 51 that obstruct the first end 312 of the first group 310 of seats and are located along an extension of the extraction channels 325. The plug elements 51 are for example teeth (preferably radial) that extend from a same annular structure 50. The teeth alternate circumferentially with slots 52 interposed between the teeth.

In the second configuration, the plug elements 51 free the first group 310 of seats and the extraction channels 325. In the second configuration the plug elements 51 are therefore located along an extension of the second group 320 of seats.

Conveniently, the brush 1 comprises additional annular support means applied (keyed) onto the shaft 2 and intended as removable supports for flexible cleaning elements. Conveniently, said additional support means are stacked upon each other. The first and/or the second support means 31, 32 and/or the additional support means are extractible from the shaft 2.

Conveniently, the brush 1 comprises for example a third support means 33. The third support means 33 conveniently comprises a third group 330 of seats in which a third set 43 of cleaning elements is removably positioned. Conveniently, the first support means 31 is interposed between the second support means 32 and the third support means 33. Conveniently, the third support means 33, the first support means 31, and the second support means 32 are consecutive to one another along the shaft 2. In the appended figures, the third support means 33 indicates, by way of example, the support means that is below the first support means 31. The third group 330 of seats define extensions (along lines that are conveniently parallel to the rotation axis 20) of the grooves 3130 (fashioned in the first support means 31).

What has been described with reference to the first support means 31 can be conveniently repeated for the third support means 33. The seats of the second group 320 and corresponding seats of the third group 330 extend are reciprocally aligned along a direction parallel to the rotation axis 20. The subject matter of the present invention also relates to a vehicle washing system (for example for an automobile) comprising a brush comprising one or more of the previously described features.

The subject matter of the present invention also relates to a method for maintaining a brush. The maintenance can comprise a replacement or cleaning of the first set 41 of cleaning elements. The maintenance method can comprise a step of assembling the first set 41 of cleaning elements to remaining parts of the brush.

Conveniently, the brush 1 can comprise one or more of the previously described features.

The step of assembling the first set 41 of cleaning elements to remaining parts of the brush 1 comprises the steps of:
 placing the first set 41 of cleaning elements at least partly in said channels 325 (see for example FIG. 5 or 16); the channels are on the second support means 32;
 moving (typically lowering) said first set 41 of cleaning elements, engaging them in the first group 310 of seats (see FIG. 6 or 18); the first group 310 of seats are on the first support means 31; the seats of the first group 310 are rectilinear and are aligned along lines with corresponding rectilinear channels 325; therefore, the step takes place quickly.

Conveniently, the step of moving said first set 41 of cleaning elements and engaging them in the first group 310 of seats is interrupted when the first set 41 of cleaning elements abuts against the limit stop means 315 positioned at the second base 317.

Conveniently, after the step of engaging the first set of cleaning elements in the first group 310 of seats, the rotatable element 5 is moved so as to pass from the second to the first configuration (the ordinal adjectives "first" and "second" do not refer to a chronological order). In this manner, the first set 41 of elements is securely positioned on the first support means 31.

The step of assembling the first set 41 of cleaning elements to remaining parts of the brush 1 can be preceded by a step of inserting the first and the second support means 31, 32 into the shaft 2 (see FIGS. 3, 4 and 13 to 15).

The step of assembling the first set 41 of cleaning elements is followed by a step of applying the second set 42 of cleaning elements onto the second support means 32. This operation takes place substantially as previously described for the first set 41. In this case, the insertion takes place in the support means positioned above the second support means 32 and then the cleaning elements are moved into the second group of seats 320 of the second support means 32. The operation is thus repeated iteratively for all the support means on which the cleaning elements are to be positioned. Conveniently, the method comprises a step of removing the first set 41 of cleaning elements from the brush 1. See for example FIGS. 3 to 6 and 13 to 21, followed backwards.

The step of removing the first set 41 of cleaning elements from the brush 1 comprises the sub-steps of:
 moving the first rotatable element 5 from the first to the second configuration.
 extracting the first cleaning element 411 from the first seat 311, positioning it at least partly in one of said channels 325 fashioned in the second support means 32; in the solution illustrated by way of example, the extraction takes place from above (in the solution in FIG. 1 it is necessary to move the first cleaning element 411 entirely into one of the channels 325 of the second support means 32; in the solution in FIG. 18 it is sufficient to move the anchorage means 62 into one of the channels 325 of the second support means 32; in fact, in this case the walls of the first group 310 of seats no longer retain the first set 41 of cleaning elements);
 moving the first cleaning element 411 laterally away from the second support means 32.

Conveniently, the step of removing the first set 41 of cleaning elements takes place without tools such as, for example, a screwdriver, monkey wrench, etc.

Conveniently, the step of assembling the first set 41 of cleaning elements to remaining parts of the brush 1 takes place without tools such as, for example, a screwdriver, monkey wrench, etc.

The invention achieves important advantages.

Firstly, it enables a rapid assembly/disassembly of the cleaning elements to and from the support means. Moreover, it enables the components to be optimised, thus reducing production costs.

The invention thus conceived is susceptible of numerous modifications and variants, all falling within the scope of the inventive concept which characterises it. Moreover, all of the details may be replaced with other technically equivalent elements. All of the materials used, as well as the dimensions, may in practice be any whatsoever, according to needs.

The invention claimed is:

1. A rotating brush for a vehicle washing system comprising:
   i) a shaft rotatable about a rotation axis thereof;
   ii) a first annular support means surrounding a first section of said shaft and comprising a first group of longitudinal seats; said first support means extending along the rotation axis between a first and a second base; a first direction of travel of the first group of the longitudinal seats being defined by the first base towards the second base, each of the longitudinal seats of the first group comprising a first and a second end;
   iii) a first set of cleaning elements engageable in the first group of longitudinal seats, a first cleaning element of said first set comprising:
      a flexible part intended to come into contact with the vehicle;
      an insert intended to be inserted into a first seat of said first group of seats fashioned on the first support means; said flexible part being constrained to said insert;
   said shaft passing through said first support means and setting said first support means and said first set of cleaning elements into rotation about said rotation axis;
   said insert being extractible from said first seat by longitudinal sliding along the first seat; said first cleaning element projecting outwards from the first seat through a single longitudinal slot;
   wherein the rotating brush comprises a limit stop means for the first set of cleaning elements which stops a movement of the first set of cleaning elements according to the first direction along the first group of seats; said limit stop means being positioned at the second base; the limit stop means being in a single piece with the first support means;
   the brush comprises a second annular support means surrounding a second section of the shaft said second support means comprising a second group of seats in which a second set of cleaning elements are engaged; said second support means comprising extraction channels for extracting the first set of cleaning elements from said first group of seats; said extraction channels being aligned with the first group of seats; the seats of the second group alternating with said extraction channels; the first and the second support means are modular elements.

2. The brush according to claim 1, characterised in that said limit stop means is integrated into said first support means.

3. The brush according to claim 1, characterised in that the brush comprises a disk positioned consecutively to the second base of the first support means along the rotation axis; said disk comprising said limit stop means.

4. The brush according to claim 1, characterised in that said limit stop means defines a bottom of each seat of the first group so as to prevent the passage of the first set of elements through the second end.

5. The brush according to claim 4, characterised in that each seat of the first group comprises a first and a second lateral side that are reciprocally connected by the bottom, said bottom closing off the seats of the first group and extending continuously.

6. The brush according to claim 1, characterised in that the brush comprises a rotatable element that is movable between a first configuration in which said rotatable element obstructs the first end of the seats of the first group and a second configuration in which it frees said first end, allowing the extraction of the first set of cleaning elements.

7. The brush according to claim 6, characterised in that said rotatable element is positioned consecutively to the first support means along the axis.

8. The brush according to claim 6, characterised in that said rotatable element is an annular element coaxial with the first support means.

9. The brush according to claim 6, characterised in that said rotatable element is positioned above the first support means.

10. The brush according to claim 6, characterised in that, in the first configuration, said rotatable element obstructs one end of the extraction channels of the second support means.

11. The brush according to claim 1, characterised in that said first support means comprises a channel to the rear of the first seat; said channel and said first seat of the first group being separated by a wall having a connecting slot; said insert of the first cleaning element) comprising an anchorage means that passes through said slot and widens in said rear channel so as to preclude the radial extraction of the first cleaning element from the first support means.

12. The brush according to claim 1, characterised in that said first support means comprises a plurality of separate annular structures arranged consecutively along the rotation axis.

* * * * *